June 5, 1934.  P. J. YOUNG  1,962,047
WAVE MOTOR
Filed April 17, 1933   3 Sheets-Sheet 1
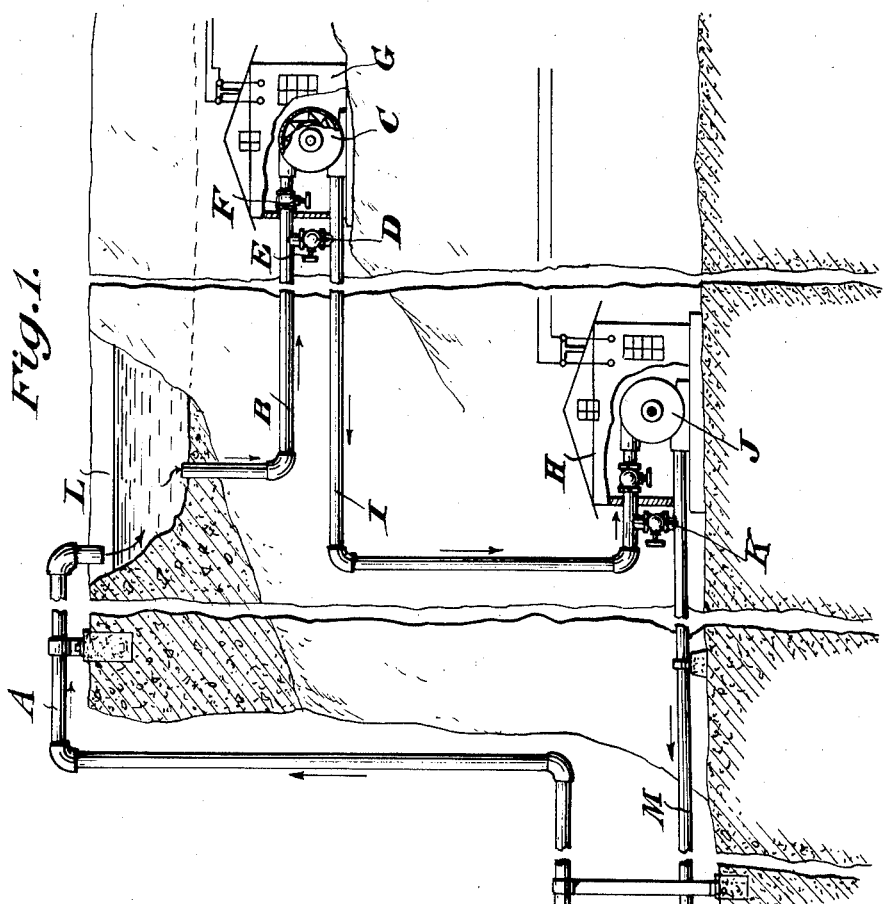
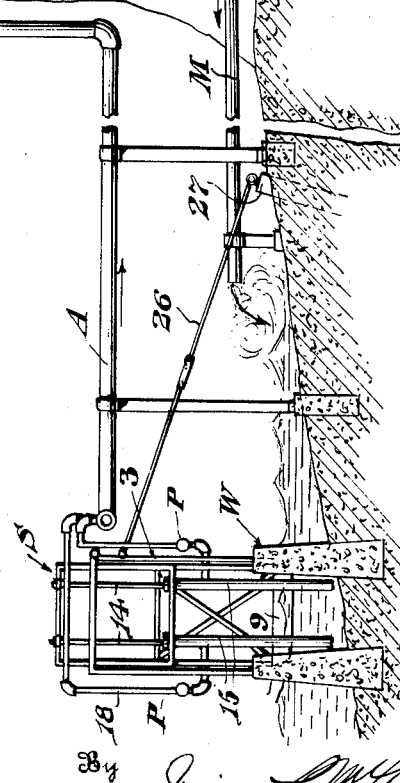
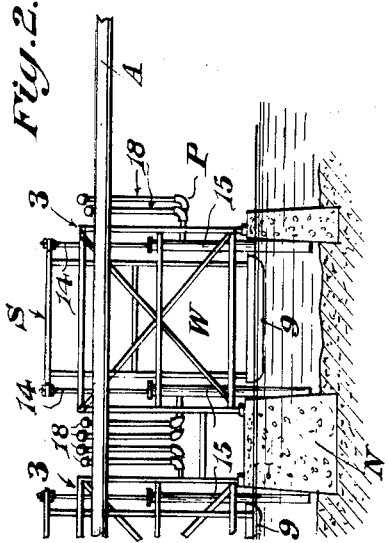

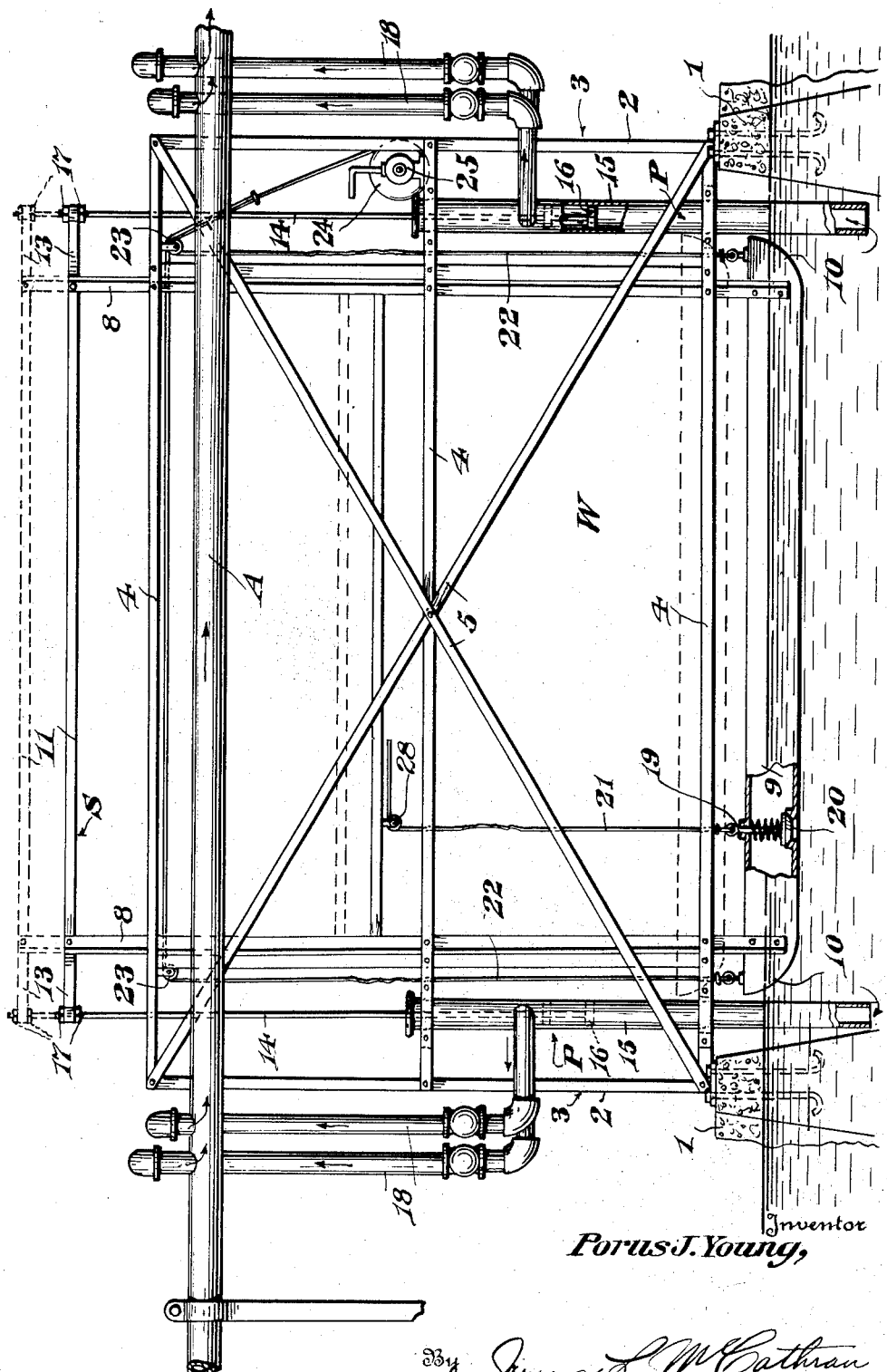

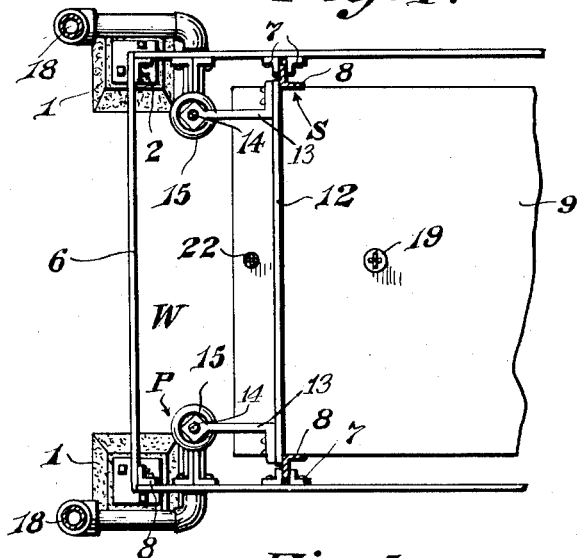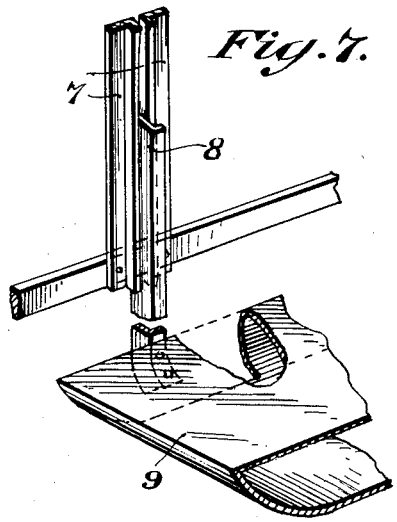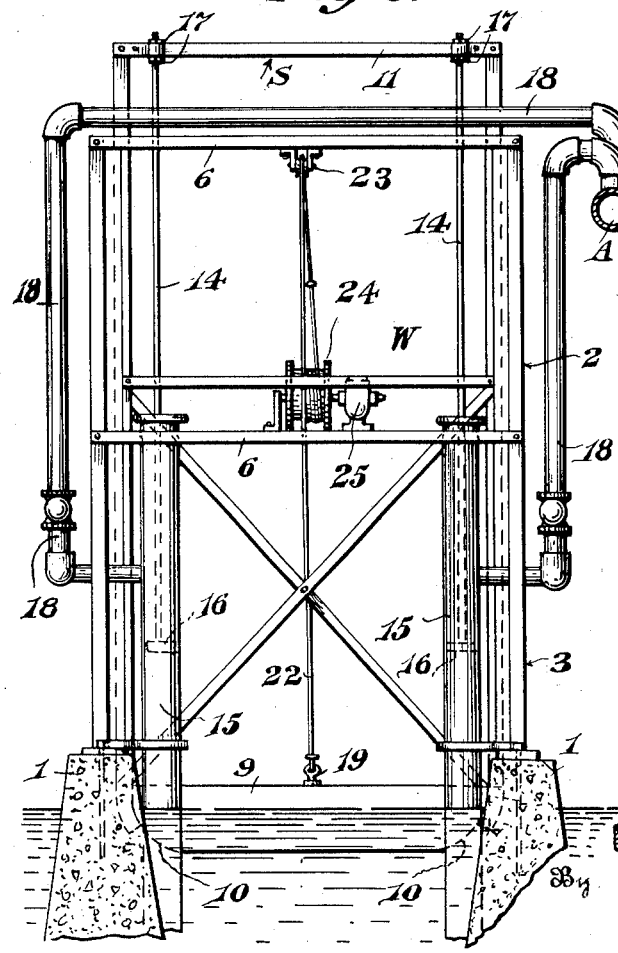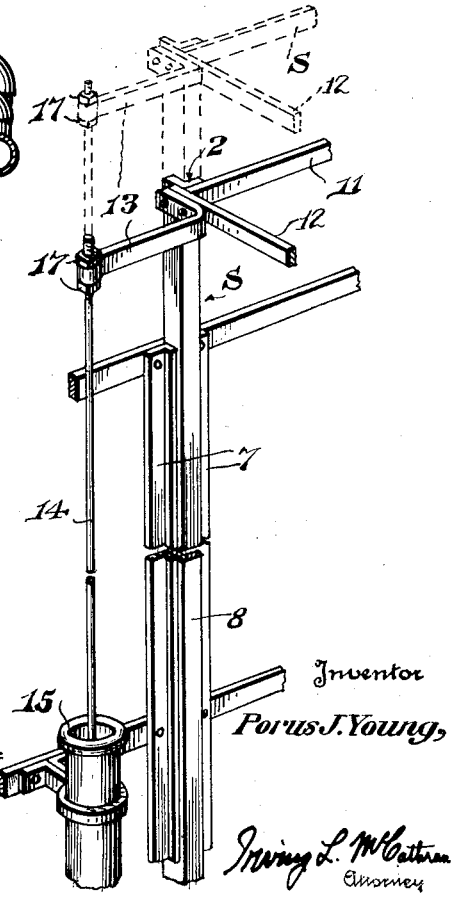

Patented June 5, 1934

1,962,047

UNITED STATES PATENT OFFICE 1,962,047

WAVE MOTOR

Porus J. Young, Clendenin, W. Va.

Application April 17, 1933, Serial No. 666,587

2 Claims. (Cl. 103—70)

This invention relates to wave motors, and has for its object the production of a simple and efficient motor which is especially designed for creating power obtained from the movement of the waves of the ocean.

Another object of this invention is the production of a simple and efficient means for pumping water through the medium of the wave motor to a higher elevation where the water is to be passed through a series of conduits for the purpose of driving dynamos, generators, or other means of motive power.

A further object of this invention is the provision of a simple and efficient wave motor which is so constructed as to actuate a series of pumps for the purpose of elevating a liquid to a desired level where the liquid may be utilized for the purpose of driving a rotor, or other power mechanism.

A still further object of this invention is the production of a simple and efficient means for controlling the operation of the float and permitting the sinking, as well as the raising, of the float at the will of the operator.

With these and other objects in view, this invention consists in certain novel combinations, and arrangements of parts as will be hereinafter more fully described and claimed.

In the drawings:—

Figure 1 is a side elevation in the nature of a diagrammatic view illustrating a system employed in carrying out the present invention whereby water is elevated to a desired height and is then utilized for driving a suitable power generator or other motor;

Figure 2 is an end elevation of a series of motors mounted in adjoining relation;

Figure 3 is an enlarged side elevation, certain parts being shown in section of the wave or tide motor;

Figure 4 is a transverse sectional view through one end of the frame and a portion of the wave motor;

Figure 5 is an end elevation of the wave motor;

Figure 6 is a detail perspective view showing a fragmentary portion of the supporting frame, the vertically movable sash which is carried by the float, and a portion of one of the pumps; and Figure 7 is a detail sectional perspective view of a portion of the float showing the manner in which the sash is connected thereto and the manner in which the sash slides upon the track rails carried by the support.

In carrying out the present invention, I preferably employ a wave motor indicated in general by the letter W, which carries a series of pumps P communicating with a main pipe A, which pipe A empties into a reservoir or lake L preferably located at an elevation above the motor W. To this lake L is connected a drain pipe B which may operate a suitable motor or generator C, a suitable by-pass pipe D being employed to cut off the passage of water from the lake L when desired from the motor or generator C. A suitable valve E is carried by the by-pass pipe D and a suitable valve F is carried by the pipe D beyond the by-pass pipe D, as shown in Figure 1. The motor or generator C is preferably located within a suitable housing unit G and a further housing unit H may be located on a lower elevation which may be connected to the pipe B and the pipe D through the medium of a pipe I. A generator or motor J may be located in the housing unit H and may be provided with a suitable by-pass K controlled by suitable valves, such as described with respect to the valves E and F, and a discharge pipe M may lead from the motor or generator J back to the ocean or other motor units. It should be understood that any type of motor or generator may be substituted for the motors or generators C and J without departing from the spirit of the invention, and the lake L may be located at any suitable elevation and at any distance from the shore line where the desired elevation may be obtained.

The wave or tide motors W may be located in any desired number either parallel to the shore and parallel to each other or end-to-end without departing from the spirit of the invention. All of the pumps P may be connected to communicate with the main pipe A so as to permit the operation of a motor W independent of or jointly with the other motors. As is shown in Figure 2, the motors may if desired be placed side by side and have their pumps P connected to the main line A. It is not desired, however, to limit the present invention to any particular arrangement of the motors W, but where the motors are arranged side by side as is shown in Figure 2, the adjoining motors may rest along their adjacent sides upon a suitable supporting pier N.

I will now describe in detail the particular type and construction of the wave motor which I employ in carrying out the present invention:— Suitable supporting piers 1 may be located at proper spaced intervals for supporting the end standards 2 of the main frame 3 comprising the wave motor W. The end standards 2 are connected longitudinally by means of the longitudinally extending bracing tie rods 4 which may be employed in any suitable or desired number, one preferably being located near the bottom, another near the center, and a third along the top. Suitable cross braces 5 may also be employed, as shown in Figure 3. The vertically extending standards 2 which are arranged in transverse relation are connected by means of the transversely extending brace or tie members 6 which may also be used in any suitable or desired number. In this manner a substantially rectangular frame-work 3 is employed. Arranged near each end of the frame 3 and upon each side thereof is a pair of closely arranged angle iron track-ways 7 which extend vertically and are slightly spaced to provide track channels for the vertically movable angle rails 8 which are carried by the float 9.

Located so as to hang below the frame 3, as shown in Figure 3, is the float 9 previously mentioned, which preferably comprises a hollow tank structure suitably shaped along its edges 10 to facilitate the raising and lowering movement of the float 9 under the impact or ebb and flow of the waves. This float 9 carries a plurality of vertically extending L-shaped rails 8 which are secured in any suitable or desired manner to the sides of the float and these rails 8 fit between the closely arranged track-ways 7 previously described, which are carried by the frame 3, in this way providing an elongated guiding channel and track for the rails 8 to hold the float 9 in place, and at the same time permit free rise and fall of the float due to the action of the waves. The upper ends of the end rails 8 of the float are connected by means of longitudinally extending tie rods 11 and the transversely opposite rails are connected by means of the transversely extending tie rods 12, as shown in Figure 4. These tie rods 11 and 12 may also be further braced, if desired. This structure will provide a sash-like frame for the float which will rise and fall under the action of the waves and tide, and thereby produce a sash frame S. Near each corner of the sash frame S is provided a projecting arm 13 and each arm 13 is connected to a piston rod 14 working within a pump cylinder 15. The pump cylinders 15 are anchored at spaced points upon the bottom and intermediate tie rods 4, as shown in Figures 3 and 5, and in detail in Figure 6. A suitable piston head 16 is carried by each piston rod 14 and the pumps 15 in each instance are suitably constructed to provide for the elevation of water as the pistons 16 reciprocate within the pump cylinders 15 due to the rise and fall of the sash S. The rods 14 may be suitably adjusted through the medium of the locking nuts 17, shown in detail in Figure 6. It should be understood that any suitable or desired number of pumps may be employed and each pump casing 15 is connected to the main pipe A by means of a connecting pipe 18, as clearly shown in the drawings.

In rough weather it may be desired to prevent the float 9 from working and when this is true the float may be sunk through the medium of a suitable spring pressed valve 19 carried within the float, which is adapted to normally close the port 20. A suitable control line 21 may be connected to the valve 19 whereby the valve may be manually operated to an opened or closed position by pulling the line 21. This line 21 passes over the pulley 28 carried by the sash S and provides a remote control valve operating means, as shown in Figure 3, and may extend to the shore or any convenient place of control remote from the float. The line may normally remain slack so as to prevent the opening of the valve under the action of the motor.

In order to again raise the float 9, suitable elevating cables 22 are connected thereto passing over suitable pulleys 23 and these pulleys 23 may be connected to a suitable windlass 24 actuated by a motor 25 of any desired structure.

In mounting the motor W, as shown in Figure 1, a suitable series of braces 26 may be employed, which may be anchored through the medium of suitable stakes 27. Other bracing means may be employed without departing from the spirit of the invention.

It should be understood that after the float 9 has been raised after once having been sunken, the valve 19 may be actuated to permit the water to drain out from the float whereupon the valve 19 may be released for closing the port 20, and the float 9 may then again be dropped upon the surface of the water. As the water rises and falls, this action will cause the reciprocating movement to be provided for the float 9, and the sash frame S, thereby reciprocating the piston rods 14 and pumping the water up through the pumps P to the main line A whereupon the water will flow into the lake L and will ultimately be returned to its normal or original course after passing through the various motors or generators C and J, in this way utilizing the force of the water from the lake L for creating electrical current through the medium of a generator or driving other power mechanism through the medium of a rotary water motor.

It should be understood that certain detail changes in the mechanical construction may be employed without departing from the spirit of the invention, so long as these changes fall within the scope of the appended claims.

Having described the invention, what is claimed as new is:—

1. A wave motor of the class described comprising a supporting frame, means for firmly anchoring said supporting frame in place, a sash frame mounted for vertical sliding movement upon said supporting frame being provided with a plurality of vertically extending pairs of spaced angle irons constituting track-ways, said sash frame comprising vertically extending angle irons constituting corner braces projecting slightly laterally of the sides of the sash frame and traveling between the angle irons of the various pairs to constitute a guide to permit the vertical sliding movement of the sash frame upon said supporting frame and also constituting means for preventing the lateral shifting of the frame, water pumps anchored upon said supporting frame and extending vertically thereof and projecting down below the water line, pump rods carried by said sash frame for actuating said pumps, an actuating float anchored in engagement with the lower ends of said angle irons carried by said sash frame, the float being of a width less than the transverse distance between said track-ways of said supporting frame, the lower ends of said angle irons of said sash frame being curved inwardly toward the float and away from the track-ways to permit of the free vertical sliding of the float without obstruction and also without lateral excess strain upon the pump rods.

2. A wave motor of the class described comprising a main supporting frame adapted to be placed in a body of water, anchoring means engaging said supporting frame for anchoring said supporting frame in position upon the bed of a body of water, the anchoring means extending below the water line, vertically extending pump cylinders anchored upon said main supporting frame and having their lower ends projecting below the water line, vertically extending track-ways arranged upon said main supporting frame near each end and upon each side, transverse braces for said supporting frame, a skeleton-like sash frame comprising vertically extending angle corner braces and longitudinally and transversely extending braces for tying the corner braces in position and bracing the corner braces against lateral strain, said angle corner braces constituting runners and fitting in said track-ways of said main supporting frame to provide a light, durable and inexpensive structure, a float carried by the lower ends of said corner braces, projecting arms carried by said sash frame, pump actuating rods carried by said projecting arms and extending into said pump cylinders, means connected to said pump cylinders for conveying liquid from the pump cylinders to a suitable reservoir or main outlet, said pump cylinders having inlet means located below the water line, means carried by the main supporting frame for facilitating the raising of said float mechanism, flexible means normally maintaining a slack condition operable by said last mentioned means for raising said float, and pulleys for guiding said flexible means, said pulleys being carried by said main frame.

PORUS J. YOUNG.